United States Patent [19]

Quintanar et al.

[11] 4,089,490
[45] May 16, 1978

[54] FILM TRANSPORT MECHANISM

[76] Inventors: Roberto Quintanar, 919 E. Magnolia; Sergio Quintanar, 1064 E. Providentia; Alexandro Quintanar, 919 E. Magnolia, all of Burbank, Calif. 91501; Delbert K. Matthews, 7853 Sancola Ave., Sun Valley, Calif. 91352

[21] Appl. No.: 592,786

[22] Filed: Jul. 2, 1975

[51] Int. Cl.² .......................... G03B 1/04; G03B 1/54
[52] U.S. Cl. ........................................ 242/181; 226/78; 242/190; 242/205; 352/124; 352/166
[58] Field of Search ............... 242/205, 181, 191, 196, 242/201, 202, 206, 189, 190; 226/76, 78, 118; 352/124, 125, 123, 166, 198

[56] References Cited

U.S. PATENT DOCUMENTS

| 2,914,265 | 11/1959 | Vanderwal, Jr. | 242/190 |
| 3,118,629 | 1/1964 | Chitty | 242/190 |
| 3,613,976 | 10/1971 | Guerro et al. | 226/118 |
| 3,776,623 | 12/1973 | Browder | 352/124 |
| 3,863,862 | 2/1975 | Robins et al. | 242/205 |

Primary Examiner—George F. Mautz
Attorney, Agent, or Firm—John E. Wagner

[57] ABSTRACT

A film transport mechanism for use in conjunction with a motion picture projector is a free standing unit carrying supply and takeup reels and associated drive motors. The arbors for the supply and takeup reels are generally parallel, and positioned therebetween is a free running sprocket assembly. Film direction rollers cause film from the supply reel to run over one side of the sprocket and additional rollers to direct the return film from a projector over the opposite side of the sprocket whereby the rate of film advance to the projector and return are equal. The transport mechanism transfers a major portion of the torque required to pull film off the supply reel from the projector to the transport thereby significantly reducing the tension on the film going to and from the projector. The entire assembly includes a support structure having a vertical column supporting the motors, arbors and the control electronics, and constitutes a conduit for virtually all electrical interconnections. Control circuitry controls the takeup motor as a function of film movement between the sprocket and the takeup reel and energizes both rewind and takeup motors during the rewind cycle. The speed on rewind is controlled by the control circuitry by controlling the current to the normal run takeup motor. Failsafe circuitry prevents unintended shutoff during restart situations, but turns off the transport mechanism after a few seconds in case of a film break or runout.

10 Claims, 6 Drawing Figures

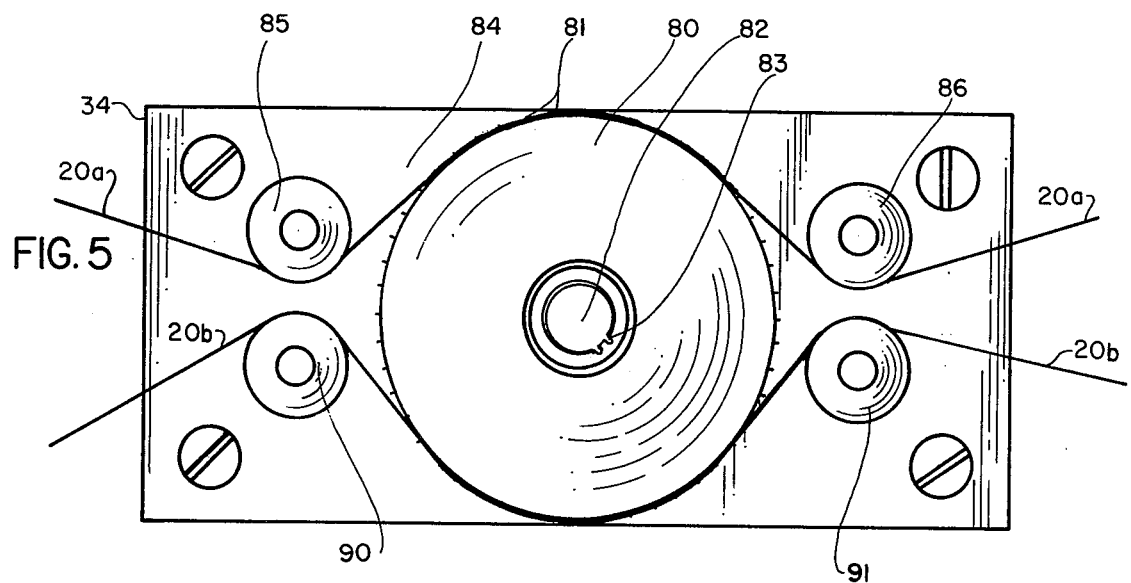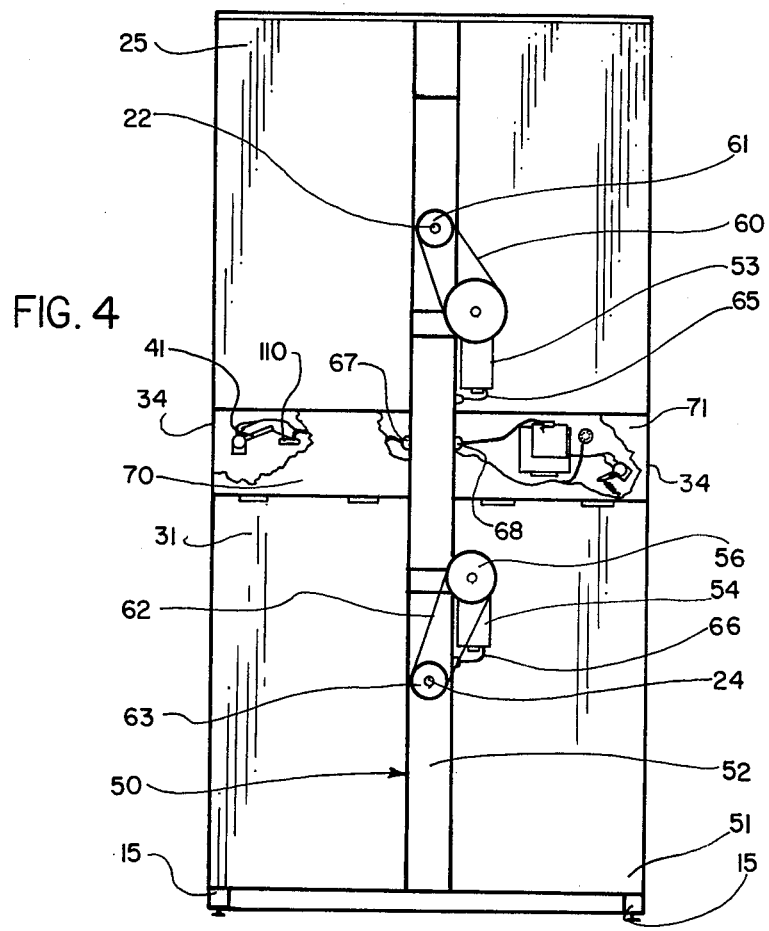

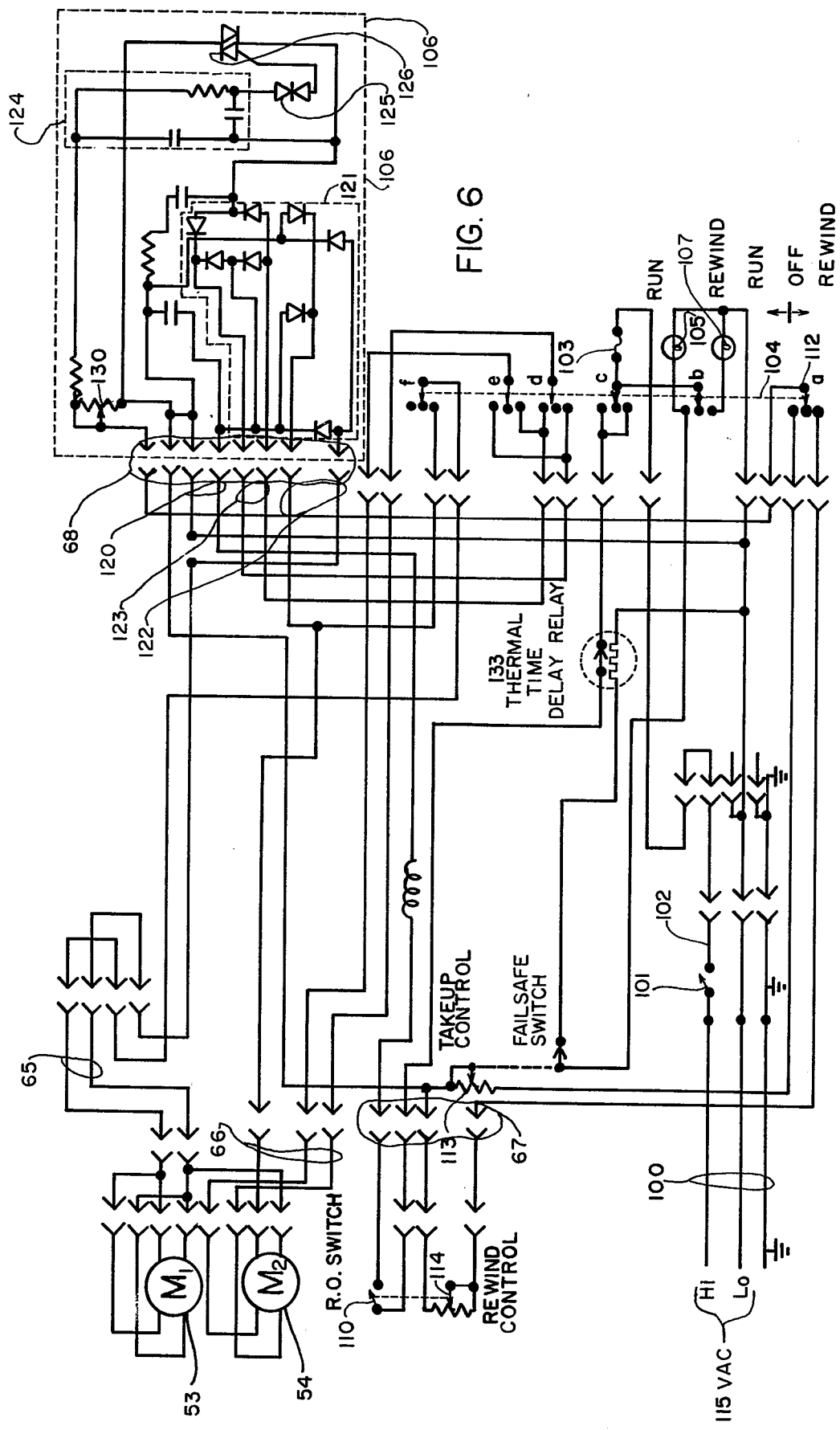

FILM TRANSPORT MECHANISM

BACKGROUND OF THE INVENTION

In recent years, in the motion picture exhibition field, there has been a growing trend towards automated and semi-automated motion picture theaters. The end objective is to provide a motion picture theater with a totally unattended projection room during normal hours programming and required services of a skilled projectionist only for the steps of loading a projector with a film prior to showing and at the rewinding at the conclusion of the performance. Recent developments in improved light sources for motion picture projectors as disclosed in U.S. Pat. No. 3,720,460 have eliminated the need of continuous monitoring of projection lamps.

A typical evening showing in a commercial theater includes 3 to 4 hours for projection, possibly with one intermission, constituting the handling on one reel for such a full evening performance, has not effectively been accomplished. A full three to four hour reel of 35 mm or wider film constitutes 36–40 inches diameter mass, weighing between 50 and 100 pounds. Not only is it difficult to handle in loading but the requirements in loading are severe, namely the great momentum of such reel of film, the danger of undue stress on the film by the transport system, the need to sense film breakage and make immediate recovery, all have heretofore constituted problems which have not been solved.

Attempts have been made to produce transport systems exploying a number of vertically arranged large flat platters which support the film in two or three segments but such platter mountings have taken a large area of floor space close to the projector and in addition to lack of completely satisfactory performance, have necessarily involved twisting of the film to assume the appropriate plane of travel through the projector.

In line type of large film handling devices have also been developed which provide a mount for a projector, however, such devices have limited film capacity.

An even more significant limitation in the prior art is the fact that in the handling of large reels of film, typically independent drive motors have been used for supply and take-up and any deviation in drive speed of the supplier or take-up can result in film tension producing film breakage.

BRIEF STATEMENT OF THE INVENTION

Each of the deficiencies present in the prior art are overcome in our invention which employs a pair of reels journalled for rotation about parallel, vertically displaced axes with the reels located in a common plane. Individual drive motors for both the drive and take-up reels are employed.

Both cooperate on rewind. On film drive, the film from the supply reel passes over one side of a stabilizer sprocket while the return film from the projector passes over the opposite side of the same sprocket whereby the total length of film passing through the projector remains constant dispite any variations in speed either of the supply or take-up reels, and the transport takeup drive aids the projector in the handling of film from the supply reel.

Speed control means is connected to at least one roller in the film system i.e. one roller in the take-up system whereby variations in the speed of the take-up reel or the projector are detected and speed compensated in the take-up reel accordingly.

One feature of the invention involves the mounting of all drive members from a vertical column of substantial strength whereby reliable alignment between the supply and take-up reels and drive motor therefor is maintained while mechanical and electrical interconnections are in that column.

Another feature of the invention involves the mounting of all control circuitry in horizontally disposed enclosures, supported by and in electrical communication with the central column.

Still another feature of the invention involves all control circuitry located in the central enclosure which may be removed easily, opened for service and exchanged without interference with the drive mechanism.

Another feature of this invention involves the control circuitry for the apparatus in which idler arms are present on both the projector to sprocket film regions and the sprocket to take-up reel film regions to accommodate for changes in the film advance speed without danger of film breakage.

Another feature of this invention involves a simultaneous use of both the supply and take-up reel motors during rewind for controlled high speed rewind.

BRIEF DESCRIPTION OF THE DRAWINGS

These features may be more fully understood from the following detailed description and by reference to the drawings in which:

FIG. 4 is a rear elevational view of this invention with portions broken away for clarity;

FIG. 5 is an enlarged front elevational view of the stabilizer sprocket of this invention; and FIG. 6 is an electrical schematic diagram of this invention.

DETAILED DESCRIPTION OF THE INVENTION

Figure 1:
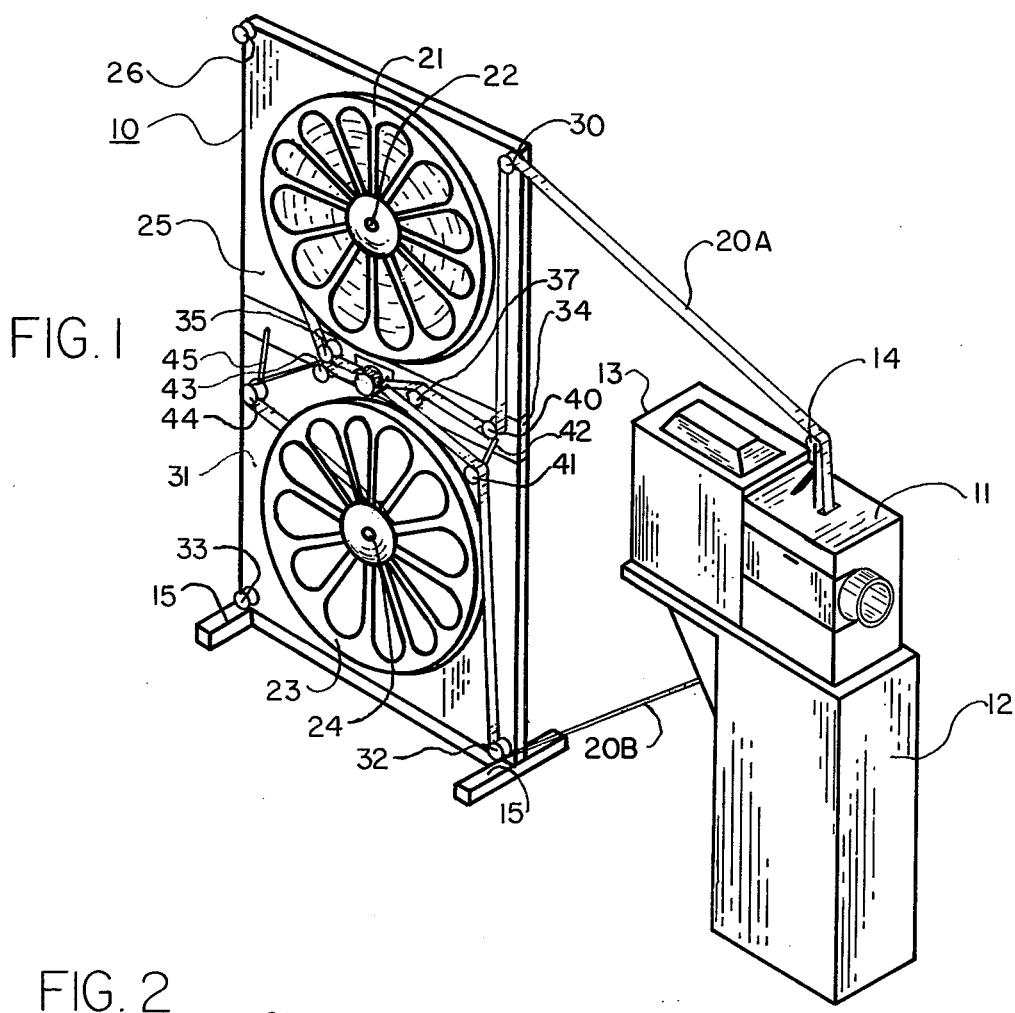
FIG. 1 is a perspective view of a film transport mechanism in accordance with this invention shown in association with a projector and light source.

Now referring to FIG. 1, a film transport mechanism in accordance with this invention, generally designated 10, is shown in its normal operating position behind a projector 11 which is supported on its pedestal 12 along with its light source 13. The film transport mechanism 10 is generally aligned with the guide roller 14 of the projector 11, although the transport mechanism may be located at different positions in the projection booth and film fed to the projector 11 via a number of rollers which may change the direction of the film or merely support it.

Of particular importance, however, in the principal application of this invention, the transport mechanism is aligned behind the projector so that the film undergoes no twisting whatsoever in handling. This is in preference to so called platter type systems where extensive twisting of the film occurs. The film transport mechanism of this invention employing the free running sprocket described hereinafter, reduced tension on the film so that if the particular installation requires a twisting of the film the overall tension on the film is reduced and thus the liklihood of film breakage on a twist film installation is reduced.

The transport assembly 10 is free standing on a pair of legs 15 and may be mounted on casters to allow the assembly 10 to be rolled around for makeup or transfer from projector to projector. The assembly 10 may be seen as mounting a film supply reel 21 on a first arbor 22 and a takeup reel 23 on a second arbor 24. The reel 21 rotates about a horizontal axis and is adjacent to a backing plate 25 while the takeup reel 23 rotates about an axis parallel to the axis of arbor 22 while adjacent to backing plate 31. The backing plate 25 mounts a pair of rollers 26 and 30 which serve to direct the film to the projector 11. In the position shown behind the projector 11, roller 30 is used. For reverse or other locations, roller 26 may be used. Plate 31 mounts similar rollers 32 and 33. Between the plates 25 and 31 is a control assembly 34 described below in connection with FIG. 5.

Figure 2:
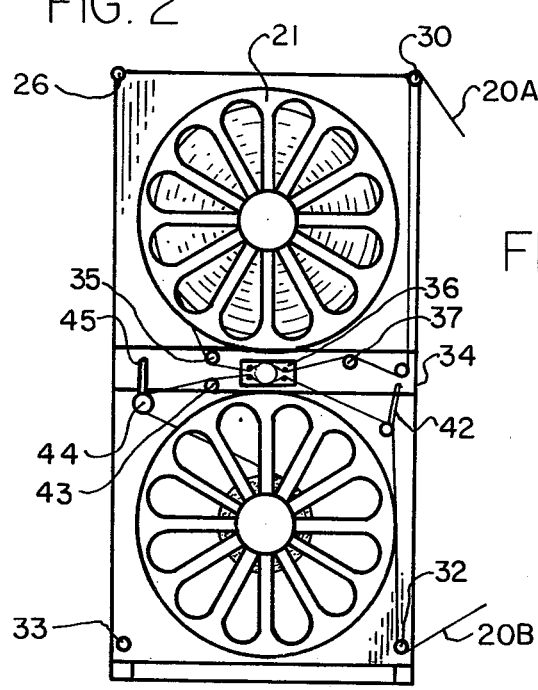
FIG. 2 is a front elevational view of the film transport mechanism of this invention shown in the forward or run position.

As shown in FIG. 1 and better seen in FIG. 2, film 20 is fed from the supply reel 21 over roller 35 to a sprocket assembly 36, over roller 37, under roller 40, to roller 30 and thence to the projector 11 at 20A.

Return film 20B passes around roller 32, over an idler roller 41 on an idler arm 42 and thence to the sprocket assembly 36 where it passes over the opposite side (bottom) of a sprocket, then over roller 43, over a speed control idler 44 on arm 45 and thence to the take-up reel 23.

The film path as illustrated in FIGS. 1 and 2, defines a closed loop beyond the rollers 30 and 32 through the projector 11. The loop of film is supplied to the projector and returns across the common film drive member, the sprocket assembly 36. This sprocket assembly as described below in greater detail, is free running and film driven. Film passes the sprocket assembly 36 on a frame by frame basis equally in both the delivery (top) and return (bottom) sides of the sprocket. Therefore the film quantity to the right of the sprocket assembly 36 remains constant at all times during run cycles of the apparatus, and the takeup reel 23 aids the projector 11 in pulling the film 20A from the supply reel 21. In the run cycle, only the takeup reel 23 is driven and the takeup rate is controlled by the speed control idler 44 and runout idler 41 as is best described in connection with FIG. 6.

Figure 3:
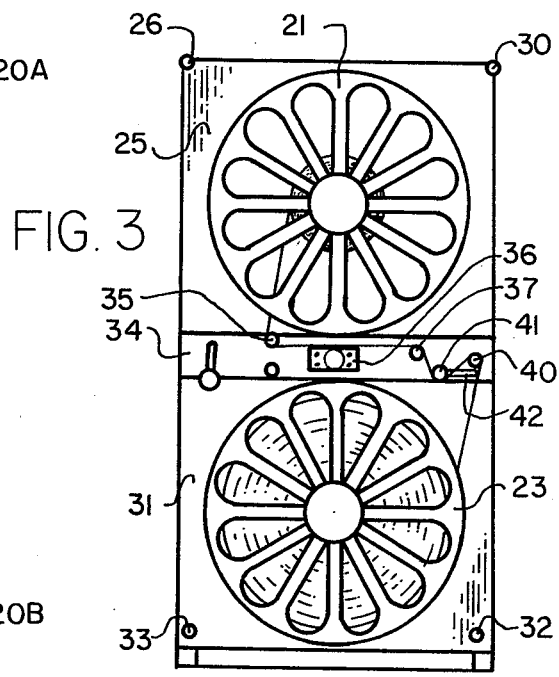
FIG. 3 is a front elevational view of the film transport mechanism of FIG. 1 shown in the rewind position.

The rewind film path of the apparatus is illustrated in FIG. 3. The film on reel 23 passes over 40, under idler 41 over roller 37, under roller 35, and thence to the reel 21. The sprocket assembly 36 and idler 44 are unused. As is described below, both the reels 21 and 23 are driven on rewind with the takeup drive running in reverse to feed film back to the supply reel allowing high speed rewind with complete control of both reels at all times by the control circuitry. The runout idler 41 through its arm 42 and associated switch shown in FIG. 6 stops both motors at the end of rewind as signalled by drop of arm 42 as the film end passes idler 41.

Now referring to FIG. 4, the frame assembly 50 may be seen more clearly. It involves a horizontal frame member 51 resting on feet 15 and supporting a vertical column 52 which constitutes the backbone of the entire assembly. This column 52 supports both the takeup motor 54, the rewind motor 53 and the arbor 22 for the supply reel 21 of FIG. 1-3 and the arbor 24 for the take-up reel 23 of FIGS. 1-3. The motors 53 and 54 are fractional horsepower reversible motors. Motor 53 drives a pulley 55 through a right angle reduction gear box not shown. Belt 60 on pulley 55 drives arbor 22 via a slip clutch 61. The motor 54, through its gear box, unshown, drives pulley 56 which, through belt 62 drives the arbor 24 through a slip clutch 63. It should be noted that the electrical connection for both drive motors 53 and 54 is through respective line and plugs 65 and 66 which mate with sockets in the column 52. One of the features of this invention is that the support assembly 50 and in particular the column 52 constitutes the main structural support for the entire assembly and also constitutes the conduit for virtually all of the electrical wiring.

Approximately midway upward on column 52, between the backing plates 25 and 31, are a pair of access doors 70 and 71 which close the control circuitry assembly 34 of the apparatus. These two access doors 70 and 71 constitute the closures for the control assembly 34 which may be removed from the entire film transport mechanism merely by electrical disengagement of a pair of plugs 67 and 68 and mechanical removal of the assembly 34 from the column 52. Therefore, in the extreme case of control circuit problems, an entire assembly 34 may be removed and replaced in a matter of a few minutes. It should be noted that extreme mechanical stability of the working elements of this film transport mechanism is achieved because of the backbone column 52 which supports both drive and takeup motors, the driving belts, clutches and arbors associated therewith and supports the entire weight of the supply and takeup reels and their film. The panels 25 and 31 and the control assembly 34 do not support any of the film or motor weight, only the film advance pulleys and the sprocket assembly 36 of FIG. 5.

With the above description of the basic elements of the film transport mechanism in accordance with this invention, attention is now directed to FIG. 5 illustrating the heart of this invention, namely the sprocket assembly 34. This assembly includes a sprocket 80 bearing a number of teeth 81, each at the required tooth spacing for the film to be handled. The sprocket 80 is freely mounted for rotation on arbor 82, for example, by low friction ball bearings. Sprocket 80, as shown, is maintained by clip ring 83 in place or any other type of retainer may be used. Low friction free wheeling mounting of the sprocket 80 on the baseboard 84 of the assembly is desired. The baseboard 84 also mounts four low friction guide rollers 85 and 86 associated with the feed supply path, and 90 and 91 associated with the return supply takeup path of film. The film path through the assembly 34 is shown by film 20A from the supply side of the apparatus and 20B on the return side of the apparatus. Please note that the continuous strip of film 20 passes over opposite sides of the same sprocket 80 in one to one registration whereby exactly the same footage of film is returned in the path 20B as is supplied beyond sprocket 80 over path 20A, the tension in film 20B on the left side of the sprocket is transferred thereby to the film 20A coming from the supply reel, thus significantly reducing tension on film 20A on the right (projector) side of the sprocket A.

ELECTRICAL CONTROL CIRCUIT

The effective film handling and rewind employing this invention is accomplished employing the electrical control circuit of FIG. 6. It is connected to a source of alternating current via line conductors 100 and line switch 101. Power is supplied over lead 102, a fuse 103 and the "C" contacts of a main function switch 104 through the normally closed contacts of thermal time delay relay 133, via runout switch 110 associated with the arm 41 of FIGS. 1 and 2 and thence to a speed control circuit 106, described below.

The main function switch includes 6 double throw sections a-f, all ganged for simultaneous operation up in Run, down in Rewind and center in the Off position. The contact sets provide the following functions:

"a" selects the control potentiometer 113 or 114 for speed control on run or rewind;

"b" lights either the run or rewind lamps 105 or 107; and furnishes power to thermal time delay relay through failsafe switch in run position;

"c" applies power to speed control circuit 106;

"d & e" selects motor M2(54) direction forward or reverse;

"f" applies power to motor M1(53) on rewind only.

Power to motors M1 and M2 is furnished through the speed control circuit 106. Specifically 115v AC is applied to the circuit 106 via leads 120 and via full wave rectifier network 121 provides 115v DC to the field windings or motor M2 via leads 122 and also supplies both the armature and field current for motor M1 on rewind only through the same leads 122.

A controlled pulsating DC is applied to the armature of motor M2 over leads 123. The actual current supplied is determined by phase shift network 124 by controlling the voltage to a diac 125 which triggers a triac 126. A trimmer potentiometer sets optimum triggering levels but the actual speed control depends upon the position of the takeup control potentiometer 113 on Run, or the Rewind control 114 on Rewind. In Run, with normal tension on the film as denoted by the intermediate position of idler 44 as shown in FIG. 1, the takeup control is at an intermediate point and speed is maintained constant. If the idler arm 45 swings to the right indicative of fast takeup, the speed of motor M2 is reduced by movement of takeup potentiometer 113; on slow takeup speed as denoted by movement of spring loaded arm 45 to the left, the speed of motor M2 is increased by control 113.

On Rewind, both motors M1 and M2 are driven via function switch 104 contacts d, e and f. These motors are driven with rewind motor M1, directly by rectified DC from rectifier 121 of control circuit 123. Motor M2 has its field supplied with DC from rectifier 122 and its armature with controlled DC on leads 123. The direction of rotation of motor M2 is reversed by operation of the run rewind switch 104 so that the motor M2 feeds film back to the supply reel from the takeup reel. The rewind control 114 limits the speed of the motor M2 and both motors drive their respective reels via slip clutches so no undue film tension exists.

Upon film runout as noted by the drop of arm 41 of FIG. 1, the runout switch opens removing power from both motors.

One additional failsafe feature of this apparatus is also disclosed in FIG. 6. It involves a time delay relay 130 coupled mechanically to the takeup control 113. This relay operates in Run mode only if film breaks between the idler sprocket and the takeup reel. When the takeup control arm operates, it closes the power circuit to the time delay relay 131, which after several seconds, e.g. 5, opens the AC line to the control circuit 106 turning everything off. If the arm is down less than the response period of the relay, operation will continue without interruption. This feature is important on certain restart situations where the takeup and control arm may swing down for a few seconds while a heavily loaded takeup reel starts.

It should be noted in FIG. 6 that a large number of plugs and jacks are illustrated represented by arrow heads and tails respectively. These are shown to illustrate that the entire electrical as well as the mechanical system is modular and may be rapidly disassembled and any part replaced in a matter of a few seconds or minutes at the most. This feature is important to maintaining reliable service to the audience.

The mechanical modular nature of this invention is best visible in FIG. 5. The main support structure is the base 51 and column 52. The electrical circuits including the printed circuit boards carrying the control circuit 106 and potentiometers 113 and 114 and all switches are centered within the enclosure 34. This enclosure is secured as by machine screws to the column 52. The plates or backing members 25 and 31 are similarly secured to the column 52 by machine screws or other features. Either plate 25 or 31 may be removed independently at each other or of the enclosure 34 without any interference with the electrical system. Plates 25 and 31 serve primarily to protect the reels from inadvertant bumping and to shield the motor drive systems from the front. Ready access to the motors 53 and 54 and the electronics is available from the rear.

The above described embodiments of this invention are merely descriptive of its principles and are not to be considered limiting. The scope of this invention instead shall be determined from the scope of the following claims, including their equivalents.

What is claimed is:

1. A film transport mechanism for supplying film to and receiving film from a separate motion picture projector comprising:

a supporting frame for positioning adjacent to a motion picture projector;

a first arbor rotatably mounted on said frame for supporting a film supply reel;

a second arbor rotatably supported on said frame for supporting a film takeup reel;

first motor means for driving said second arbor;

a sprocket rotatably mounted on said frame;

roller means for directing film from a supply reel on said first arbor to pass over said sprocket and thence to the film supply input of an associated motion picture project additional roller means directing return film from said associated motion picture projector around a portion of said sprocket and thence to a film takeup reel supported by said second arbor;

said sprocket driven by film passing thereacross for maintaining a fixed rate of film to and from said projectors;

idler means secured to said frame and movable responsive to variation in film tension between said sprocket and said second arbor;

speed control means for said first motor means responsive to return film tension as detected by said idler means.

2. The combination in accordance with claim 1 including second motor means;

said second motor means coupled to drive said first arbor; and switch means operative to energize said first motor means only when said mechanism is supplying film from said supply arbor to an associated projector and both said first and second motor means when said mechanism is rewinding film from said second arbor to said first arbor.

3. The combination in accordance with claim 2 wherein said motor control means applies operating current to said first motor means on the operation of controls to the run position with the speed of said first motor means responsive to the position of said idler arm;

said motor control circuit responsive to operation on rewind to apply operating current directly to said second motor means and through said idler control to said first motor whereby both of said arbors are driven on rewind with the second motor means driving said first arbor controllable in speed as a function of tension of the film from said first arbor.

4. The combination in accordance with claim 2 wherein said frame includes a base;
a vertical support member;
means mounting said first and second motors from said vertical support member;
means mounting said first and second arbors from said support member;
said vertical support comprising a single hollow tubular member;
the electrical circuitry for an operation of said first and second motors being conducted at least in part through the apparatus within said vertical column.

5. The combination in accordance with claim 4 including enclosure means for supporting said sprocket and idler means;
said enclosure members supported by and demountable from said column independent of said motors and first and second arbors.

6. The combination in accordance with claim 4 including horizontal support member secured to said vertical column intermediate said first and said second arbors;
said horizontal support member defining an enclosure for control circuits for said apparatus;
said horizontal member demountable from said column.

7. A film transport assembly comprising:
a base;
a vertical support column;
a first arbor mounted for rotation about a generally horizontal axis from said column;
a second arbor mounted for rotation about a generally horizontal axis from said column and vertically displaced from said first arbor a sufficient distance to allow the mounting of a pair of film reels, one on each arbor with space therebetween;
motor means coupled to at least one of said arbors to drive said arbor and a film reel carried thereby;
a film speed control assembly including an enclosure on said column and enclosing a portion therein in the space between said arbors;
electrical conduit means for said motor and said film speed control assembly extending through said column;
electrical connector means mounted in said column for connection with respective motor means and film speed control assembly;
a sprocket journalled for rotation about a generally horizontal axis in the region between a pair of reels mounted on respective arbors;
first roller means directing film from a supply reel on the first arbor over said sprocket;
second roller means for conducting film from said sprocket to a projector;
third roller means directing film returning from a projector to said sprocket;
fourth roller means directing film across the opposite side of said sprocket and to a takeup reel on said second arbor;
said roller means and sprocket defining a closed film loop for said projector to one side of said film transport assembly;
idler means connected between said last roller and said sprocket; and
speed control means for said motor coupled with said idler means to vary the speed of the motor as a function of displacement of said idler means.

8. A film transport assembly comprising;
a base;
a vertical support column;
a first arbor mounted for rotation about a generally horizontal axis from said column;
a second arbor mounted for rotation about a generally horizontal axis from said column and vertically displaced from said first arbor a sufficient distance to allow the mounting of a pair of film reels, one on each arbor with space therebetween;
motor means coupled to at least one of said arbors to drive said arbor and a film reel carried thereby;
a film speed control assembly including an enclosure on said column and enclosing a portion therein in the space between said arbors;
electrical conduit means for said motor and said film speed control assembly extending through said column;
electrical connector means mounted in said column for connection with respective motor means and film speed control assembly;
a first backing member surrounding said first arbor and supported by said column;
a second backing member surrounding said second arbor and secured to said column;
said backing members extending outward from said arbors at least as far as the diameter of the largest reel to be handled by said arbors; and
means individually and removably mounting said control assembly and said backing members whereby each is individually demountable from said column without removal of said arbors.

9. The combination in accordance with claim 8 wherein said first and second backing members are rectangular; roller means mounted for rotation on said backing members and including;
at least one roller located at an upper corner of the upper of said backing members;
at least one roller located at a lower corner of the lower of said backing members whereby film may be delivered and recovered by said transport from the upper and lower corners thereof.

10. The combination in accordance with claim 9 including additional roller means at a second upper corner of said upper backing plate and at a second lower corner of said lower backing plate whereby film may be directed to a projector from either edge of said transport.

* * * * *